Dec. 20, 1938.                I. MOEN                2,140,845
                        VEHICLE TRACTION WHEEL
                         Filed May 10, 1937            2 Sheets-Sheet 1

Inventor
Ingman Moen
By Arthur H. Sturges
                    Attorney

Dec. 20, 1938.   I. MOEN   2,140,845
VEHICLE TRACTION WHEEL
Filed May 10, 1937   2 Sheets-Sheet 2

Inventor
By Ingman Moen
Arthur H. Sturges
Attorney

Patented Dec. 20, 1938

2,140,845

UNITED STATES PATENT OFFICE 2,140,845

VEHICLE TRACTION WHEEL

Ingman Moen, Omaha, Nebr.

Application May 10, 1937, Serial No. 141,715

5 Claims. (Cl. 305—13)

The present invention relates to traction wheels, adapted particularly for use on tractors and like vehicles where it is essential to obtain a broad or large area traction surface for operation over soft ground.

An object of the present invention is to provide a traction wheel with a plurality of treads independently operable and spring mounted so that the treads may independently assume various angular and depth positions with respect to the ground for obtaining a maximum tread surface with the ground.

Another object of the invention is to provide a construction of traction wheel with a plurality of treads which may be disposed in offset or staggered relation transversely of the wheel, and which may be provided with interconnecting means for use in coupling together consecutive treads to position the treads at a desired angle as they strike the ground to protect the latter, and abutments or spurs on the treads when the wheel is operated over relatively hard surface roads or the like.

The invention also has for an object a tread structure for application to traction wheels wherein the parts are relatively large and wherein there are practically no pockets or crevices in which mud or other accumulations may pack so as to render the tread portion inoperative, the parts being so constructed that the normal movements or operations of the parts, relatively to one another, effects the expulsion or cleaning out of the parts of any dirt accumulations which may be picked up by the wheel as it is operated over the ground.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a traction wheel embodying the features of this invention, parts of the same being shown in broken lines;

Figure 1:
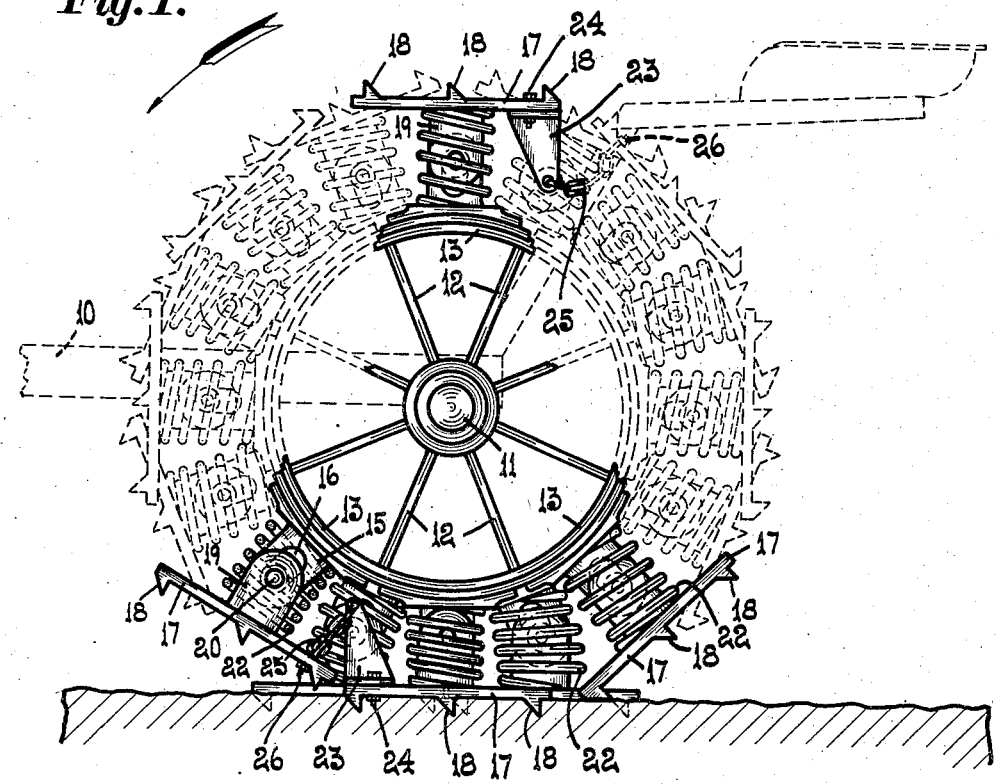

Referring now to the drawings, and first to Figure 1, 10 designates, generally, the frame of a tractor or the like upon which the traction wheel of the invention may be mounted.

The wheel comprises a hub 11 of any suitable construction having spokes 12 which provide the body portion of the wheel supporting a rim 13. The rim 13 is of suitable width so as to accommodate any desired movement of treads adapted to be mounted on the rim and arranged in any suitable manner, such as in offset or staggered relation, as shown in Figure 1.

Figure 2:
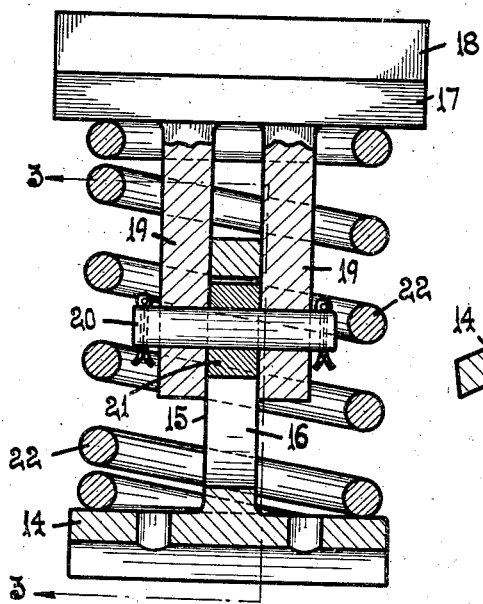
Figure 2 is a detail enlarged radial section taken through one of the treads of the wheel, axially of the wheel substantially on the line 2—2 of Figure 3.
Figure 3:
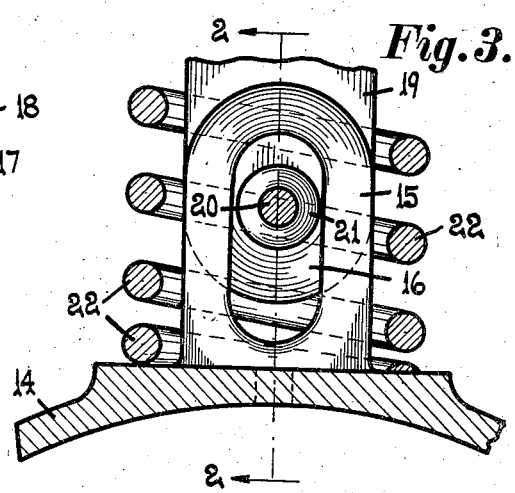
Figure 3 is a sectional view taken axially at right angles to the showing in Figure 2, substantially on the line 3—3 of Figure 2 and in the plane of the wheel.
Figure 4:
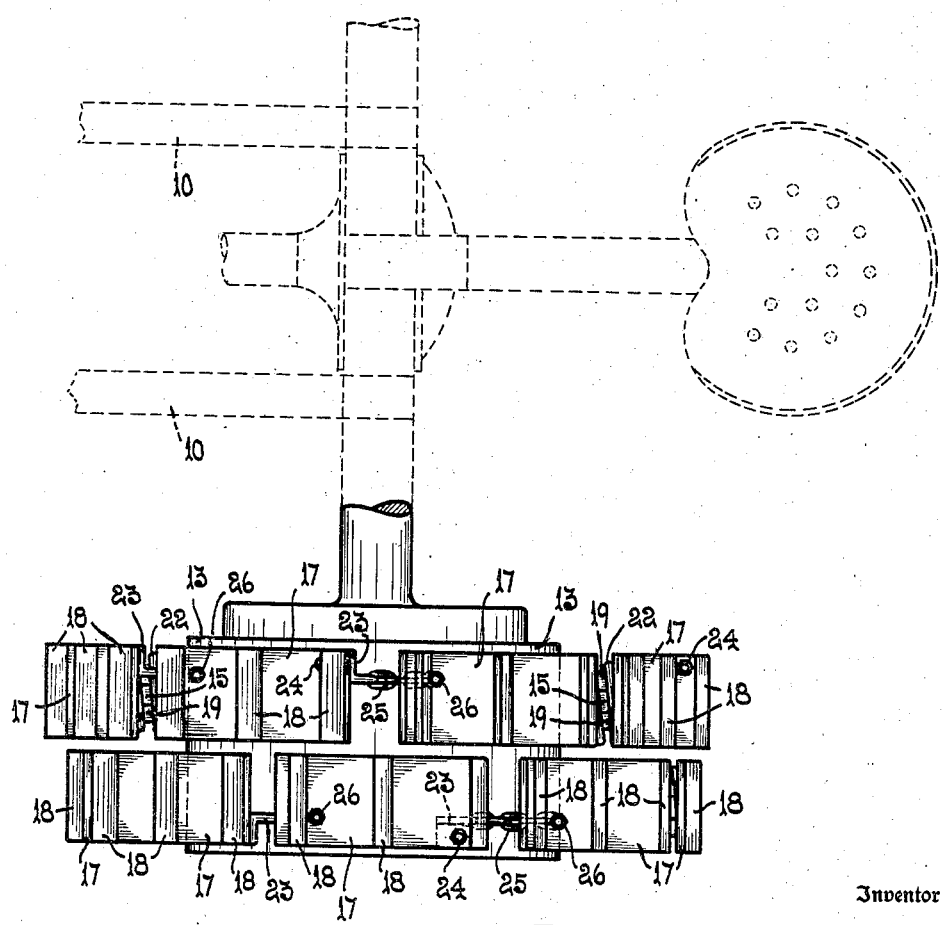
Figure 4 is a fragmentary top plan of a tractor having a wheel constructed according to an embodiment of this invention.

With reference now to Figures 2 and 3, one of the treads is shown in detail. Each tread is provided with a base plate 14 which may be a portion of the rim 13 itself, or which may be a separate structure as shown. The inner side of the base plate is longitudinally concave to seat upon the outer surface of the rim 13 and is adapted to be welded, bolted or otherwise suitably fixed thereto. The outer face of the base plate 14 is preferably flat and of substantially circular configuration to provide a spring seat. The base plate 14 is provided at its outer side with an outstanding lug 15 which is disposed in a longitudinal plane of the base plate and which is provided with a longitudinal slot or guideway 16 extending radially from the base plate as shown in Figure 3. A tread plate 17, provided with a desired number of cleats or tread strips 18 on its outer face, is adapted to engage the ground and has at its inner side a pair of spaced apart, flat ears 19 which slidably engage the opposite sides of the lug 15 and provide a bearing therefor between which the lug is free to not only move radially, but to also pivot or swing in an edgewise direction between the ears 19. The ears 19 carry a transverse pin 20 which extends through the slot 16 of the lug 15 and which may be held in place by cotter pins or the like as shown. A roller 21 is mounted upon the pin 20 in the slot 16 and is proportioned to roll against the marginal edge of the slot so as to reduce frictional engagement between the pin 20 and the lug 15 and to provide a pivotal connection between the lug and the ears. The pivotal connection permits the tread plate 17 to swing into various angular positions upon the lug 15, and the slot 16 permits the pin 20 to move lengthwise therein for admitting of the movement of the tread plate 17 toward and from the base plate 14. A coil spring 22 is disposed about the lug 15 and the ears 19 and is seated at one end upon the base plate 14 and at its other end upon the tread plate 17. The spring 22 is of sufficient inherent resistance to support the load with the desired resilient or compressing action.

In operation, as the traction wheel is rolled or propelled over the ground the tread plates 17 are brought consecutively into engagement with the ground. As shown in Figure 1, the heel or rear end of the tread plate as it approaches the ground first engages the ground and forces the adjacent cleat 18 into the surface of the ground so that the cleat will dig into the surface to obtain the desired purchase in the ground for offsetting tendencies of the wheel to skid. The continuous rotation of the wheel brings the entire lower tread surface of the plate 17 into engagement with the surface of the ground. The spring 18 takes up the load and resiliently supports the wheel on the tread plate 17, the plate 17 assuming various angular positions with respect to the base plate 14 as the connection between the base plate 14 and the tread plate 17 is pivotal as well as being telescopic in nature.

When the traction wheel is to be rolled over a relatively hard road surface which might be injured by the projection of the heel cleat 18 into the road surface, the tread plates 17 may be provided at their forward ends with inwardly extending arms 23 detachably secured by bolts 24 or the like to the tread plates so that the arms 23 are relatively rigid and are disposed at substantially right angles to the tread plates. Each arm 23 is connected to one end of a chain 25 which extends substantially radially from the inner end of the arm to the heel end of the next succeeding tread plate 17, and is attached thereto by a bolt 26 or the like. The chain 25 is so proportioned in length that when a tread plate 17 is flat upon the ground as shown in Figure 1, the next succeeding forward tread plate 17 is swung backwardly at an angle about its pivot pin 20 by the chain 25 to hold the heel portion of the forward tread plate out of engagement with the ground. In this manner the forward tread plate is brought into contact with the ground in substantially a flat position so that there is no chance of the heel cleat 18 bearing with increased pressure upon the surface of the ground and thus digging into and injuring the same.

This arrangement of the chain 25 also prevents the usual sliding of the heel portion of the tread plate over the surface of the ground as the tread plate is brought into position beneath the wheel.

It is obvious that various changes and modifications may be made in the details of construction and design of the above specifically described embodiment of this invention without departing from the spirit thereof, such changes and modifications being restricted only by the scope of the following claims.

What is claimed is:

1. A traction wheel comprising a wheel body, and a plurality of tread members mounted radially on the body, each of said tread members comprising a base plate mounted on the wheel body and having a radial lug, a tread plate having surface cleats for engaging the ground and provided with inwardly extending ears for slidable engagement against the opposite side of said lug, a pivot pin engaging through the ears and the lug, said lug having a radial slot therein to admit pivotal and sliding movement of the ears upon the lug, and a compression spring disposed between the base plate and the tread plate about said lug and ears for normally urging the ears outwardly on the lug while simultaneously resiliently maintaining said lug and ears in alignment.

2. A tread member for traction wheels comprising a base plate having a longitudinally slotted flat lug extending radially therefrom and in the plane of the wheel, a tread plate for contact with the ground and having a pair of spaced apart flat ears extending inwardly and slidably engaging the opposite sides of the said lug, a transverse pin carried by said ears, a roller mounted on said pin and disposed in the slot of said lug, and a spring mounted under tension between the base plate and the tread plate for normally urging the latter outwardly from the base plate and normally maintaining the ears in longitudinal alignment with the lug.

3. A tread member for traction wheels comprising a base plate having a slotted lug extending therefrom, a tread plate for contact with the ground, an ear carried by said tread plate, a pivotal pin extending through said ear and the slot of said lug to pivotally secure said tread plate to said lug, and an expanding spring engaging about said ear and said lug and normally urging said tread plate outwardly while simultaneously resiliently maintaining said lug and said ear in alignment.

4. In a traction wheel, a plurality of tread members and means pivotally and slidably securing said tread members to the wheel, said tread members comprising a plate, a pair of spaced apart ears secured to said plate, a slotted lug secured to said wheel and extending between said ears, a pin extending through said ears and the slot of said lug, and a spring extending about said ears and said lug for maintaining said ears and lug in alignment while simultaneously urging said plate outwardly.

5. In a traction wheel, a plurality of tread members and means pivotally and slidably securing said tread members to the periphery of said wheel, said tread members comprising a plate, a pair of spaced apart ears secured to said plate, a lug extending radially from the periphery of said wheel and engaging between said ears, said lug having an elongated slot longitudinally thereof, a pin extending through said ears and the slot of said lug, a spring engaging about said ears and said lug resiliently maintaining said ears and said lug in alignment while constantly urging said plate outwardly of said wheel, an arm secured to an end of one plate on the inner side thereof, and a connecting member connecting the inner end of said arm with the end of an adjacent plate whereby the inward movement of a tread member contacting with the ground will rock the lower end of an adjacent tread member in the direction of the wheel against the tension of said spring.

INGMAN MOEN.